(12) United States Patent
Bourret

(10) Patent No.: US 7,420,692 B2
(45) Date of Patent: Sep. 2, 2008

(54) SECURITY FONT SYSTEM AND METHOD FOR GENERATING TRACEABLE PAGES IN AN ELECTRONIC DOCUMENT

(75) Inventor: Mary Louise Bourret, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1235 days.

(21) Appl. No.: 10/617,483

(22) Filed: Jul. 11, 2003

(65) Prior Publication Data

US 2005/0007612 A1 Jan. 13, 2005

(51) Int. Cl.
G06K 15/00 (2006.01)

(52) U.S. Cl. ............... 358/1.11; 358/1.1; 358/1.15; 358/3.31

(58) Field of Classification Search ........... 358/1.1, 358/1.15, 1.9, 2.1, 3.21, 1.11, 3.31
See application file for complete search history.

(56) References Cited

U.S. PATENT DOCUMENTS

| | | | |
|---|---|---|---|
| 5,291,243 A * | 3/1994 | Heckman et al. | 399/3 |
| 5,528,742 A * | 6/1996 | Moore et al. | 715/205 |
| 5,715,069 A | 2/1998 | Hersee et al. | 358/438 |
| 5,956,471 A | 9/1999 | Ueda et al. | 395/113 |
| 6,233,684 B1 | 5/2001 | Stefik et al. | 713/176 |
| 6,782,509 B1 * | 8/2004 | Hirayama et al. | 715/210 |
| 6,886,863 B1 * | 5/2005 | Mowry, Jr. et al. | 283/72 |
| 6,917,724 B2 * | 7/2005 | Seder et al. | 382/321 |
| 7,085,399 B2 * | 8/2006 | Suzaki | 382/100 |
| 2003/0231785 A1 * | 12/2003 | Rhoads | 382/100 |
| 2004/0001606 A1 * | 1/2004 | Levy | 382/100 |
| 2005/0007612 A1 * | 1/2005 | Bourret | 358/1.11 |

FOREIGN PATENT DOCUMENTS

JP 5-346979 * 12/1993

* cited by examiner

Primary Examiner—Jerome Grant, II
(74) Attorney, Agent, or Firm—Law Office of Gerald Maliszewski; Gerald Maliszewski

(57) ABSTRACT

A security font system and method are provided for generating traceable pages in an electronic document. The method comprises: accepting an electronic document; modifying font print instructions associated with selected characters; and, transmitting the document with the modified font print instructions to a destination. In some aspects, the method further comprises saving a record of the modified font print instructions. The font print instructions can be modified clandestinely. If a printed copy of the document with modified font instructions is created, the printed copy is identical to a printed copy of a document with no modified font print instructions, as the font modification can be made undetectable, or almost undetectable to the human eye. In other aspects, the method comprises: receiving an alleged copy of the electronic document with the modified font print instructions; and, comparing the modified font print instructions in the received document to the record.

41 Claims, 3 Drawing Sheets

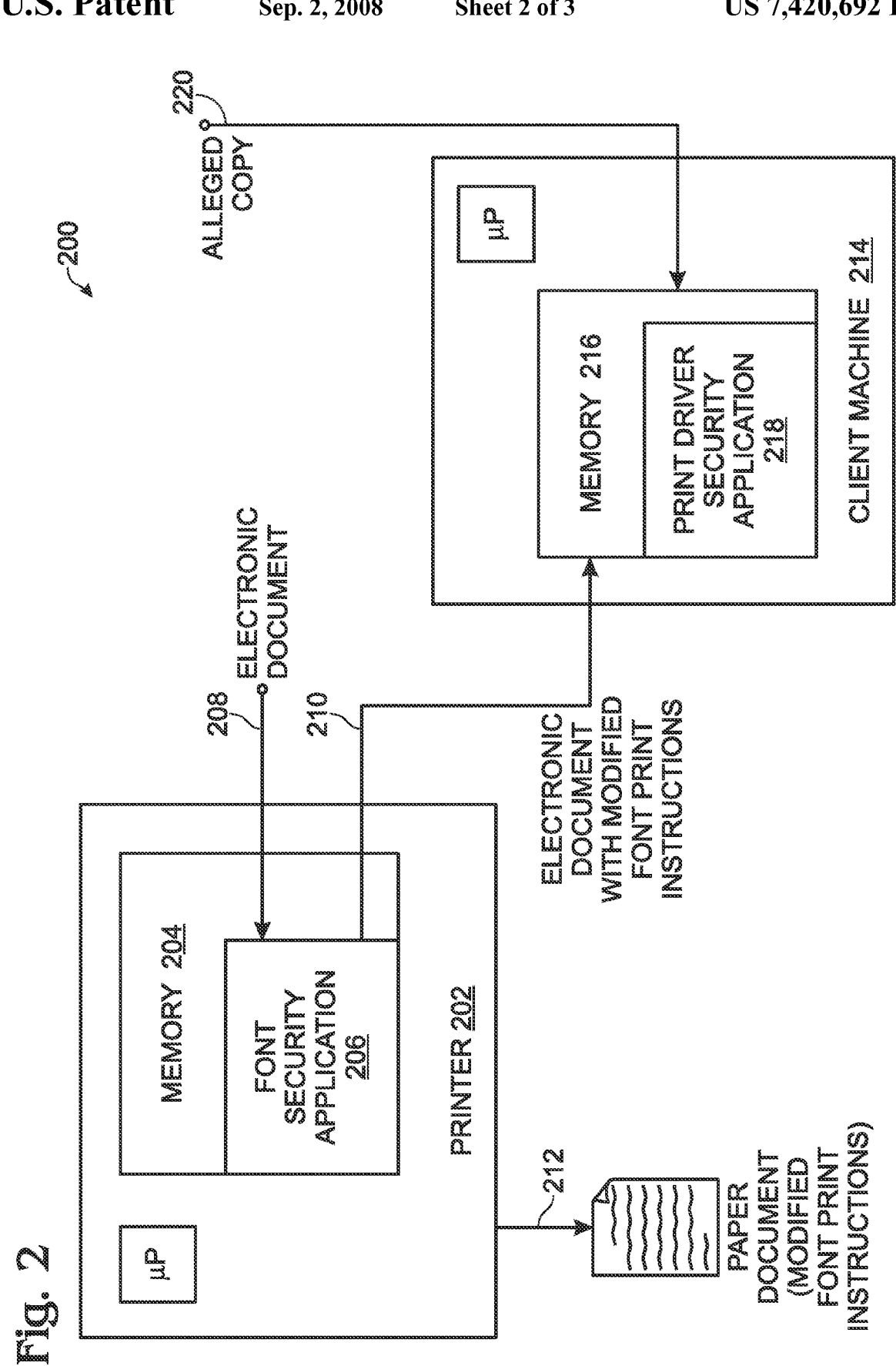

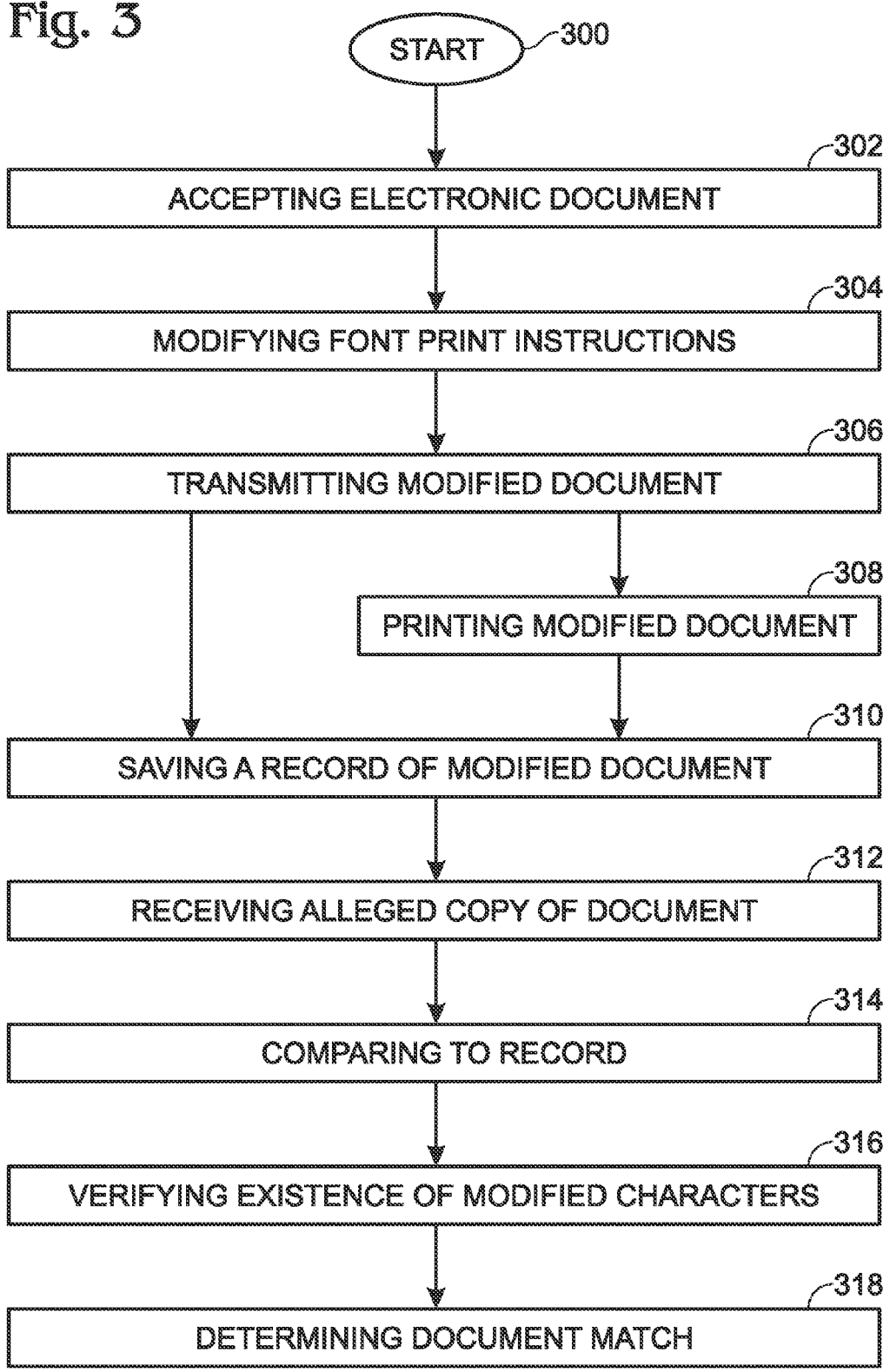

SECURITY FONT SYSTEM AND METHOD FOR GENERATING TRACEABLE PAGES IN AN ELECTRONIC DOCUMENT

BACKGROUND OF THE INVENTION

1. Field of the Invention

This invention generally relates to electronic document processing and, more particularly, to a security font system and method for generating traceable pages in an electronic document.

2. Description of the Related Art

A printed document, such as a contract, poses a security risk for the author, once the document is outside of the author's direct control. Without the author's knowledge, the document may be scanned, optical character recognition processed (OCRed), altered, and reprinted. Increased access to good quality scanning devices and OCR software makes it easier for printed pages to be altered without the author's knowledge. For example, with today's scanning and printing technology a single key page could be replaced without notice. Current solutions include:

Printing on watermarked paper and/or letterhead;
Digitally marking pages by adding information to the printed pages not easily reproduced by a scanner; and,
Signatures or initials on every page of the printed document.

It would be advantageous if there were a means of detected changes to a paper document that did not rely upon watermarks and initialing.

It would advantageous if there were a means of marking an electronic document that did not rely upon custom scanner fonts or special markings.

SUMMARY OF THE INVENTION

The present invention solves the above-mentioned security problem by permitting the author to create a font that is reproduced electronically, or on a specific printer, at the time the pages are rendered. Thus, the author can be assured that the copy sent, is the same as the copy that has been returned. This is particularly useful for legal documents consisting of thousands of words that would otherwise require a review for unauthorized changes, or that would require signature authorization for every page or key section. Rather than review every item in the contract, the author can ensure authenticity by scanning the pages for purposefully altered font characters. If the altered font characters remain, then that section of the document has not been rewritten.

Accordingly, a security font method is provided for generating traceable pages in an electronic document. The method comprises: accepting an electronic document; modifying font print instructions associated with selected characters in the document; and, transmitting the document with the modified font print instructions to a destination. In some aspects, the method further comprises saving a record of the modified font print instructions.

Modifying font print instructions associated with selected characters in the document typically includes clandestinely modifying the font printing instructions for the selected characters. If the method includes creating a printed copy of the document with modified font instructions, then the printed copy of the modified document is identical to a printed copy of the document with no modified font print instructions, as the font modification can be made undetectable, or almost undetectable to the human eye.

In other aspects, the method further comprises: receiving an alleged copy of the electronic document with the modified font print instructions; comparing the modified font print instructions in the received document to the record; in response to comparing, verifying the existence of the selected (modified) characters in the received document; and, in response to verifying the existence of the selected characters, determining that the received document matches the transmitted document.

For example, accepting an electronic document may include accepting an electronic document with a first character formatted in a first font. Then, clandestinely modifying the selected characters would include changing the number of first font printable pixels associated with the first character. Alternately, the position, the kerning, or the positional relationship to other characters can be altered.

Additional details of the above-described method, and a security font system for generating traceable pages in an electronic document are provided below.

BRIEF DESCRIPTION OF THE DRAWINGS

FIG. 2 is a schematic block diagram depicting a different aspect of the security font system for generating traceable pages in an electronic document.

FIG. 3 is a flowchart illustrating the present invention security font method for generating traceable pages in an electronic document.

DETAILED DESCRIPTION OF THE PREFERRED EMBODIMENTS

Figure 1:
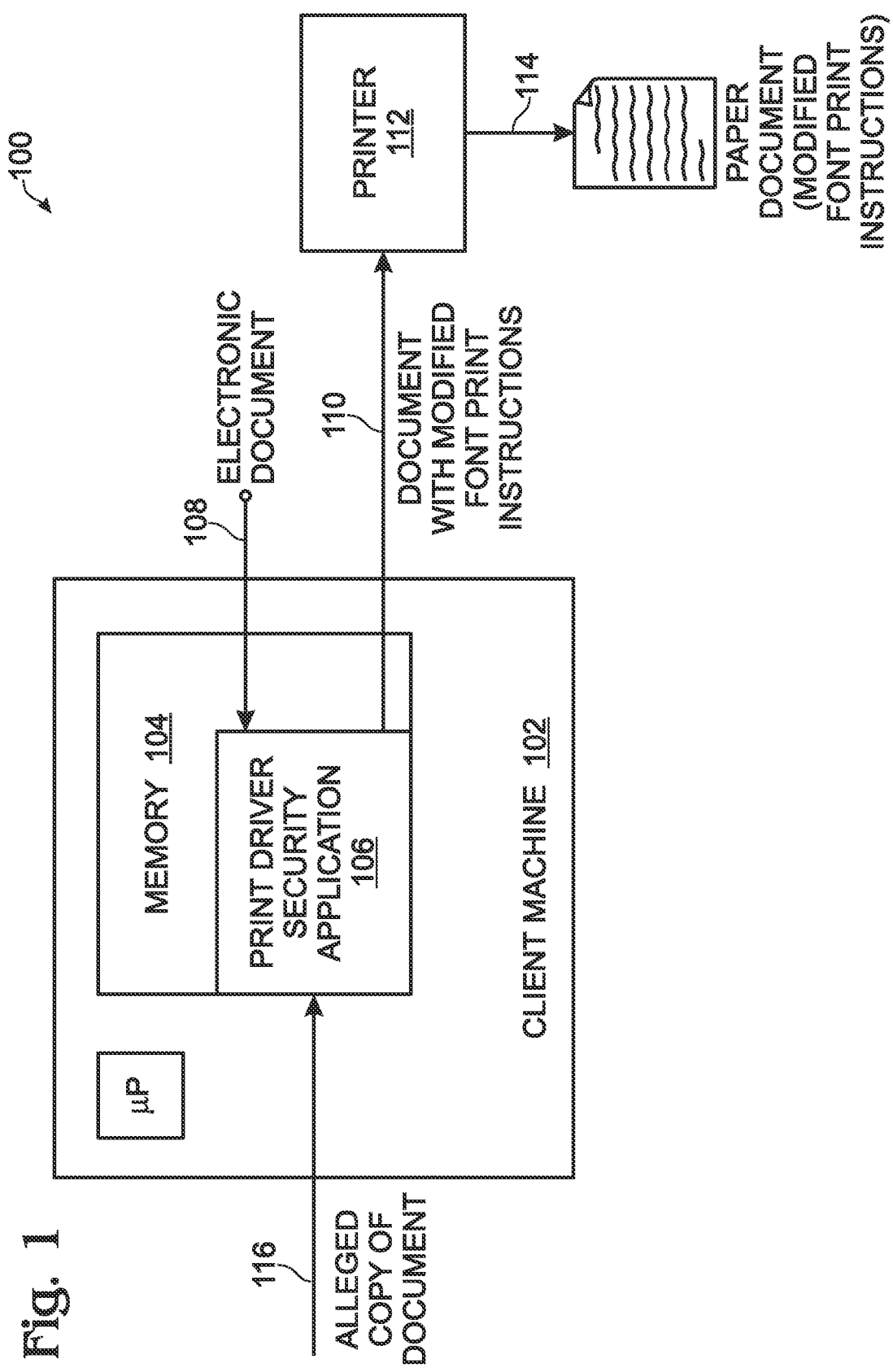
FIG. 1 is a schematic block diagram of the present invention security font system for generating traceable pages in an electronic document.

FIG. 1 is a schematic block diagram of the present invention security font system for generating traceable pages in an electronic document. The system 100 comprises a microprocessor driven client machine 102 including a memory 104 and a print driver security application 106 residing in the memory 104. The print driver security application 106 has an interface on line 108 to accept an electronic document and an interface on line 110 to supply the electronic document with modified font print instructions associated with selected characters. In some aspects, the print driver security application 106 saves a record of the modified print instruction in the memory 104.

In some aspects of the system 100, a printer 112 has an interface connected to the print driver security application on line 110 to accept the modified electronic document and an interface on line 114 to supply a printed copy of the modified electronic document.

In one application of the system, the print driver security application 106 clandestinely modifies the printing instructions for the selected characters. Typically, this means that the changes are so slight as to be undetectable if the document is printed on paper. That is, the printer 112, or any other standard printer, creates a printed copy of the modified document identical, or almost identical, to a printed copy of the document with no modified print instructions. For example, if the font is modified to remove a couple of pixels, tolerances in the printing process make the missing pixels indistinguishable from an unmodified character.

In some aspects, the print driver security application 106 has an interface on line 116 to receive an alleged copy of the electronic document with modified print instructions. The document can be sourced from a floppy disk or through a network connection such as Internet, to name two possible examples. The print driver security application 106 compares the modified print instructions in the received document to the record retrieved from the memory 104, verifying the existence of the selected (modified) characters in the received document, and so determining the authenticity of the received document.

For example, the print driver security application 106 may accept an electronic document with a first character formatted in a first font and generate print instruction to change the number of first font printable pixels associated with the first character. Alternately, the print driver security application 106 may generate print instruction to change the position, or the kerning of first font printable pixels associated with the first character. As another example, the print driver security application 106 may accept an electronic document with first and second characters formatted in a first font and generate print instruction to change the spacing of first font printable pixels associated with the first and second characters. In some aspects, the print driver security application creates changes as a type of time/stamp. That is, changes are made responsive to the time and date.

In some aspects, the print driver security application 106 randomly modifies selected characters. That is, the application determines, on a random basis, the type of modification that is to be made to a character. In other aspects, the print driver security application selects predetermined modifications, such as removing 4 pixels from a character font. Alternately, a user can manually select the type of modifications to be made.

In other aspects, the print driver security application 106 randomly selects characters for modification. For example, the application may randomly select the fourth and twenty-fifth characters on a page to be modified. In other aspects, the print driver security application selects predetermined characters to modify, such as the first character of every page. Alternately, a user can manually select the character(s) to be modified.

With respect to a single document, the print driver security application 106 may generate a different modification for each transmitted document, or for every destination. That is, copies of the same document that are sent to multiple destinations may each have a different modification. The application then saves a record of each transmitted document modification in memory 104. This would enable a user to perhaps determine the source of a documented that is distributed without authorization, for example. In other aspects, a record of security modifications can be stored for review by an administrator in a printer memory (not shown). The modified print instructions, as well as the (client machine) sources of the documents can be logged.

In another aspect of the system 100, the font modifications can be more dramatic, for use as a trademark perhaps, or in advertising. For example, the font of the first letter in a company's name can be modified for a distinct look. Alternately stated, the printer 112 creates a printed copy of the modified document perceptively different from a printed copy of the document with no modified print instructions.

FIG. 2 is a schematic block diagram depicting a different aspect of the security font system for generating traceable pages in an electronic document. The system 200 comprises a microprocessor-driven printer 202 including a memory 204 and a font security application 206 residing in the memory 204. The font security application 206 has an interface on line 208 to accept an electronic document and an interface on line 210 to supply the electronic document with modified font print instructions associated with selected characters. Typically, the printer also has an interface on line 212 to supply a printed copy of the modified electronic document.

Some aspects of the system 200 further comprise a microprocessor-driven client machine 214 having a memory 216. The font security application 206 optionally saves a record of the modified print instruction in the client machine memory 216. That is, client machine firmware may create a security logging procedure that collects all the data in memory 216 for security operations performed by the client machine 214. This data can be reviewed by a systems administrator to discover documents originating from the client machine 214, printer destinations, and the type of font changes made. Alternately, a similar kind of security logging operation can be performed by printer firmware, to collect the source of documents sent to the printer and the type of font or print instruction modifications made. This record can be saved in printer memory 204. In one aspect of the system 200, the font security application 206 clandestinely modifies the printing instructions for the selected characters. As with the system of FIG. 1, the printer 202 creates a printed copy of the modified document identical, or almost identical, to a printed copy of the document with no modified print instructions, assuming the clandestine changes are insignificant with respect to the human eye.

In other aspects of the system 200, the client machine 214 further includes a print driver security application 218 with an interface on line 220 to receive an alleged copy of the electronic document with modified print instructions. The source of line 220 can be a floppy, hard disk, or a network connection, to name a few examples. The print driver security application 218 compares the modified print instructions in the received document to the record retrieved from the memory 216. The print driver security application 218 verifies the existence of the selected (modified) characters in the received document, and so determines the authenticity of the received document.

For example, the font security application 206 may accept an electronic document with a first character formatted in a first font and generate print instruction to change the number of first font printable pixels associated with the first character. As above, the kerning or the position of the pixels can also be modified. In another example, the font security application 206 accepts an electronic document with first and second characters formatted in a first font, and generates print instruction to change the spacing of first font printable pixels associated with the first and second characters.

In some aspects, the font security application 206 randomly modifies selected characters, as described above in the explanation of the print driver security application of FIG. 1. Likewise, the font security application 206 may randomly select characters for modification, as described above.

In another, non-clandestine aspect of the system 200, the printer 202 creates a printed copy of the modified document perceptively different from a printed copy of the document with no modified print instructions. In this case, the font modifications are extensive enough to notice with the human eye.

Functional Description

The present invention can be used to create a unique font for each document printed based on a time/date stamp, randomly, or a manual user selection. This invention is different from watermarking in that it is not embedded in the paper and does not require specialty paper. Printing on watermarked or letterhead paper does not uniquely require that the document be time-stamped, or the printer identified. This invention differs from a watermark/letterhead printing in that nothing is added to the paper for the purposes of marking the document.

Digitally adding information to the printed pages is similar in that it adds unique information to the printed page, but the implementation of this solution differs in that this invention uses the combination of firmware and printer driver software to create the unique marking for the specific document at the time of printing. Thus, every print request can digitally alter the font uniquely.

This invention differs from most digital watermarking solutions in that it does not save the watermark in the document. The digital data exists on the printed page only at the time of printing.

The invention may be enabled using several software applications that in combination provide a font-editing tool for security purposes as follows:

(1) A software application embedded in printer and MFP controller that randomly removes a pixel(s) from a character (s) during the print rendering process and reports back to the application (print driver) the specific change made to the character(s) during the rendering.

(2) A printer driver that sends the command to initiate the random pattern of pixel removal by the embedded software application and record the data from the printer along with the document data and time and date stamp. Thus assuring the user that the document is identifiable as the original document created on the specified printer at that time. The printer may create a cover sheet that describes the title, number of pages, printer ID, time and date stamp and the characters in their original and modified formats.

(3) A software application to manage the level of changes.

For example a user may select to have a single pixel removed from one character, or multiple pixels removed from multiple characters, increasing the number of combinations available on the printer.

For security purposes the change in the character may be made undetectable by the unaided human eye and not machine detectable to the extent that a scanner could exactly reproduce the image with the missing pixels. As it is important to be able to identify the original document, the change may be visible with magnification. For non-security purposes the changes may be detectable and scanable.

(4) A software application that runs on the client machine sends rendered printer information directly to the print engine in a format such as bitmaps. In this embodiment, the missing pixel(s) would already be removed from the character(s) by the client software. No change by the firmware would be required.

(5) An embedded firmware application that randomly removes a pixel(s) from a character(s) during the print rendering process for all print jobs sent to the printer.

(6) For non-security uses this invention may be used to alter a character(s) for a particular font to uniquely identify a printer, a department or a company font choice. For example, the ACME company may choose to alter the way the Arial font prints the capital letter "A", as a promotional technique.

(7) Other than removing pixels, the kerning or spacing may be altered.

FIG. 3 is a flowchart illustrating the present invention security font method for generating traceable pages in an electronic document. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300.

Step 302 accepts an electronic document. Step 304 modifies font print instructions associated with selected characters in the document. Step 306 transmits the document with the modified font print instructions to a destination. In some aspects, Step 308 prints the document with the modified font print instructions. In other aspects, Step 310 saves a record of the modified font print instructions. Note, the record can be saved in a client machine originating the document, and/or in a printer that receives the document and renders a paper copy.

In some aspects of the method, modifying font print instructions associated with selected characters in the document (Step 304) includes clandestinely modifying the font printing instructions for the selected characters. Then, printing the document with the modified font print instructions in Step 308 includes creating a printed copy of the modified document identical to a printed copy of the document with no modified font print instructions. The term "identical", as used herein, could also mean virtually identical, producing changes so small as to only be detectable with a magnifying glass, for example.

Some aspects of the method include further steps. Step 312 receives an alleged copy of the electronic document with the modified font print instructions. Step 314 compares the modified font print instructions in the received document to the record. Step 316, in response to comparing, verifies the existence of the selected (modified) characters in the received document. Step 318, in response to verifying the existence of the selected characters, determines that the received document matches the transmitted document.

In some aspects, accepting an electronic document includes accepting an electronic document with a first character formatted in a first font. For example, the first character may be an "a" in a 12 point Century Schoolbook font. Clandestinely modifying the selected characters in Step 304 may include changing the number of first font printable pixels associated with the first character. For example, five pixels associated with the character "a" may be removed in the print instructions. As mentioned above, the clandestine modification may also involve changing the position of pixels, the kerning of pixels, the spacing between the first font printable pixels associated with first and second characters.

In some aspects, modifying font print instructions associated with selected characters in the document in Step 304 includes randomly modifying selected characters. Alternately, or in addition, Step 304 may randomly modify by generating a different modification for each transmitted document. Then, saving a record of the modified font print instructions in Step 310 includes saving a record of each transmitted document modification. In other aspects, Step 304 may modify randomly selected characters, as mentioned above in the explanation of FIG. 1.

In some aspects, accepting an electronic document in Step 302 includes accepting the document in a microprocessor-driven client machine enabling a print driver security application. Then, modifying font print instructions associated with selected characters in the document in Step 304 includes using the print driver security application to generate the modifications, and saving a record of the modified print instructions in Step 310 includes the print driver security application saving a record in a memory accessible by the client machine.

Further, in Step 314, comparing the modified font print instructions in the document received (in Step 312) to the record may include the print driver security application comparing the received document print commands to the print commands stored in memory.

In other aspects, accepting an electronic document in Step 302 includes accepting the document in a printer enabled with a font security application. Modifying font print instructions associated with selected characters in the document in Step 304 includes using the font security application to generate the modifications, and saving a record of the modified print instructions in Step 310 includes the font security application saving a record in a memory accessible by the micro-processor driven client machine. In some aspects, Step 314, of comparing the modified print instructions in the document (received in Step 312) to the record includes a print driver security application, enabled on a client machine, comparing the received document print commands to the print commands stored in memory.

In some aspects, accepting an electronic document (Step 302) includes accepting the document in a printer enabled with a font security application, and saving a record of the modified font print instructions (Step 310) includes saving a record of each printed document modification in a printer memory.

In other aspects of the method, printing the document with the modified print instructions in Step 308 includes creating a printed copy of the modified document perceptively different from a printed copy of the document with no modified print instructions.

In other aspects, modifying font print instructions associated with selected characters in the document in Step 304 includes substeps (not shown). Step 304*a* saves a first predetermined modification in memory. Step 304*b*, in response to accepting a first electronic document, accesses the first modification from memory. Step 304*c* uses the first modification to modify font print instructions associated with the first document.

A security font system and method have been provided for generating traceable pages in an electronic document. The invention has been exemplified and clarified through the use of specific examples. However, the invention is not limited to merely these examples. Other variations and embodiments of the invention will occur to those skilled in the art.

I claim:

1. A security font method for generating traceable pages in an electronic document, the method comprising:
   accepting an electronic document;
   clandestinely modifying font print instructions associated with selected characters in the document;
   transmitting the document with the modified font print instructions to a destination;
   creating a printed copy of the modified document identical to a printed copy of the document with no modified font print instructions; and,
   saving a record of the modified font print instructions.

2. The method of claim 1 further comprising:
   receiving an alleged copy of the electronic document with the modified font print instructions;
   comparing the modified font print instructions in the received document to the record;
   in response to comparing, verifying the existence of the selected (modified) characters in the received document; and,
   in response to verifying the existence of the selected characters, determining that the received document matches the transmitted document.

3. The method of claim 1 wherein accepting an electronic document includes accepting an electronic document with a first character formatted in a first font; and,
   wherein clandestinely modifying the selected characters includes changing the number of first font printable pixels associated with the first character.

4. The method of claim 1 wherein accepting an electronic document includes accepting an electronic document with a first character formatted in a first font; and,
   wherein clandestinely modifying the selected characters includes changing the position of first font printable pixels associated with the first character.

5. The method of claim 1 wherein accepting an electronic document includes accepting an electronic document with a first character formatted in a first font; and,
   wherein clandestinely modifying the selected characters includes changing the kerning of first font printable pixels associated with the first character.

6. The method of claim 1 wherein accepting an electronic document includes accepting an electronic document with a first character and a second character formatted in a first font; and,
   wherein clandestinely modifying the selected characters includes changing the spacing between the first font printable pixels associated with the first and second characters.

7. The method of claim 1 wherein modifying font print instructions associated with selected characters in the document includes randomly modifying selected characters.

8. The method of claim 7 wherein randomly modifying selected characters includes generating a different modification for each transmitted document; and,
   wherein saving a record of the modified font print instructions includes saving a record of each transmitted document modification.

9. The method of claim 1 wherein modifying font print instructions associated with selected characters in the document includes modifying randomly selected characters.

10. The method of claim 1 wherein accepting an electronic document includes accepting the document in a microprocessor-driven client machine enabling a print driver security application;
    wherein modifying font print instructions associated with selected characters in the document includes using the print driver security application to generate the modifications; and,
    wherein saving a record of the modified print instructions includes the print driver security application saving a record in a memory accessible by the client machine.

11. The method of claim 10 further comprising:
    receiving an alleged copy of the electronic document with the modified font print instructions; and,
    wherein comparing the modified font print instructions in the received document to the record includes the print driver security application comparing the received document print commands to the print commands stored in memory.

12. The method of claim 1 wherein accepting an electronic document includes accepting the document in a printer enabled with a font security application;
    wherein modifying font print instructions associated with selected characters in the document includes using the font security application to generate the modifications; and, wherein saving a record of the modified print instructions includes the font security application saving a record in a memory accessible by the micro-processor driven client machine.

13. The method of claim 12 further comprising:
receiving an alleged copy of the electronic document with the modified font print instructions;
wherein comparing the modified print instructions in the received document to the record includes a print driver security application, enabled on a client machine, comparing the received document print commands to the print commands stored in memory.

14. The method of claim 1 wherein modifying font print instructions associated with selected characters in the document includes:
saving a first predetermined modification in memory; and,
in response to accepting a first electronic document, accessing the first modification from memory; and,
using the first modification to modify font print instructions associated with the first document.

15. The method of claim 1 wherein accepting an electronic document includes accepting the document in a printer enabled with a font security application; and,
wherein saving a record of the modified font print instructions includes saving a record of each printed document modification in a printer memory.

16. A security font system for generating traceable pages in an electronic document, the system comprising:
a microprocessor driven client machine including:
a memory; and,
a print driver security application residing in the memory, the print driver security application having an interface to accept an electronic document and an interface to supply the electronic document with clandestinely modified font print instructions associated with selected characters, and wherein the print driver security application saves a record of the modified print instruction in the memory; and,
a printer having an interface connected to the print driver security application to accept the modified electronic document and an interface to supply a printed copy of the modified document identical to a printed copy of the document with no modified print instructions.

17. The system of claim 16 wherein the print driver security application has an interface to receive an alleged copy of the electronic document with modified print instructions, the print driver security application comparing the modified print instructions in the received document to the record retrieved from the memory, verifying the existence of the selected (modified) characters in the received document, and so determining the authenticity of the received document.

18. The system of claim 16 wherein the print driver security application accepts an electronic document with a first character formatted in a first font and generates print instruction to change the number of first font printable pixels associated with the first character.

19. The system of claim 16 wherein the print driver security application accepts an electronic document with a first character formatted in a first font and generates print instruction to change the position of first font printable pixels associated with the first character.

20. The system of claim 16 wherein the print driver security application accepts an electronic document with a first character formatted in a first font and generates print instruction to change the kerning of first font printable pixels associated with the first character.

21. The system of claim 16 wherein the print driver security application accepts an electronic document with first and second characters formatted in a first font and generates print instruction to change the spacing of first font printable pixels associated with the first and second characters.

22. The system of claim 16 wherein the print driver security application randomly modifies selected characters.

23. The system of claim 16 wherein the print driver security application randomly selects characters for modification.

24. The system of claim 23 wherein the print driver security application generates a different modification for each transmitted document and saves a record of each transmitted document modification in memory.

25. The system of claim 16 wherein the printer includes a memory for logging a record of modified print instructions.

26. A security font system for generating traceable pages in an electronic document, the system comprising:
a microprocessor-driven printer including:
a memory; and,
a font security application residing in the memory, the font security application having an interface to accept an electronic document, an interface to supply the electronic document with modified font print instructions associated with selected characters, and an interface to supply a printed copy of the modified electronic document;
a microprocessor-driven client machine having a memory; and,
wherein the font security application saves a record of the modified print instruction in the client machine memory.

27. The system of claim 26 wherein the font security application clandestinely modifies the printing instructions for the selected characters.

28. The system of claim 27 wherein the printer creates a printed copy of the modified document identical to a printed copy of the document with no modified print instructions.

29. The system of claim 28 wherein the client machine further includes a print driver security application with an interface to receive an alleged copy of the electronic document with modified print instructions, the print driver security application comparing the modified print instructions in the received document to the record retrieved from the memory, verifying the existence of the selected (modified) characters in the received document, and so determining the authenticity of the received document.

30. The system of claim 28 wherein the font security application accepts an electronic document with a first character formatted in a first font and generates print instruction to change the number of first font printable pixels associated with the first character.

31. The system of claim 28 wherein the font security application accepts an electronic document with a first character formatted in a first font and generates print instruction to change the position of first font printable pixels associated with the first character.

32. The system of claim 28 wherein the font security application accepts an electronic document with a first character formatted in a first font and generates print instruction to change the kerning of first font printable pixels associated with the first character.

33. The system of claim 28 wherein the font security application accepts an electronic document with first and second characters formatted in a first font and generates print instruction to change the spacing of first font printable pixels associated with the first and second characters.

34. The system of claim 28 wherein the font security application randomly modifies selected characters.

35. The system of claim 28 wherein the print driver security application randomly selects characters for modification.

36. The system of claim 26 wherein the printer creates a printed copy of the modified document perceptively different from a printed copy of the document with no modified print instructions.

37. The system of claim 26 wherein the printer memory logs a record of modified print instructions.

38. A security font method for generating traceable pages in an electronic document, the method comprising:
   accepting an electronic document;
   modifying font print instructions associated with selected characters in the document;
   transmitting the document with the modified font print instructions to a destination; and,
   creating a printed copy of the modified document perceptively different from a printed copy of the document with no modified print instructions.

39. A security font system for generating traceable pages in an electronic document, the system comprising:
   a microprocessor driven client machine including:
      a memory; and,
      a print driver security application residing in the memory, the print driver security application having an interface to accept an electronic document and an interface to supply the electronic document with modified font print instructions associated with selected characters; and,
   a printer having an interface connected to the print driver security application to accept the modified electronic document and an interface to supply a printed copy of the modified document perceptively different from a printed copy of the document with no modified print instructions.

40. A security font system for generating traceable pages in an electronic document, the system comprising:
   a microprocessor-driven printer including:
      a memory; and,
      a font security application residing in the memory, the font security application having an interface to accept an electronic document, an interface to supply the electronic document with modified font print instructions associated with selected characters, and an interface to supply a printed copy of the modified electronic document perceptively different from a printed copy of the document with no modified print instructions.

41. A security font system for generating traceable pages in an electronic document, the system comprising:
   a microprocessor-driven printer including:
      a memory;
      a font security application residing in the memory, the font security application having an interface to accept an electronic document and an interface to supply the electronic document with modified font print instructions associated with selected characters; and,
   wherein the printer memory logs a record of modified print instructions.

* * * * *